United States Patent
Kuiper et al.

(10) Patent No.: US 12,509,827 B2
(45) Date of Patent: Dec. 30, 2025

(54) METHOD FOR THE MANUFACTURING A 3-DIMENSIONAL SHAPED PRODUCT FROM A FLUFF PULP MATERIAL AND SUCH PRODUCT

(71) Applicant: HUHTAMAKI MOLDED FIBER TECHNOLOGY B.V., Leeuwarden (NL)

(72) Inventors: Harald John Kuiper, Heerenveen (NL); Jan Hendrik Timmerman, Brucht (NL)

(73) Assignee: HUHTAMAKI MOLDED FIBER TECHNOLOGY B.V., Leeuwarden (NL)

(*) Notice: Subject to any disclaimer, the term of this patent is extended or adjusted under 35 U.S.C. 154(b) by 1188 days.

(21) Appl. No.: 16/618,727

(22) PCT Filed: Jun. 1, 2018

(86) PCT No.: PCT/NL2018/050360
§ 371 (c)(1),
(2) Date: Dec. 2, 2019

(87) PCT Pub. No.: WO2018/222042
PCT Pub. Date: Dec. 6, 2018

(65) Prior Publication Data
US 2020/0131710 A1    Apr. 30, 2020

(30) Foreign Application Priority Data
Jun. 2, 2017   (NL) ..................... 2019021

(51) Int. Cl.
| | |
|---|---|
| *D21J 3/00* | (2006.01) |
| *B29C 43/02* | (2006.01) |
| *B65D 5/50* | (2006.01) |
| *B65D 65/46* | (2006.01) |
| *B65D 75/24* | (2006.01) |
| *B65D 85/32* | (2006.01) |
| *D04H 1/732* | (2012.01) |
| *D21H 25/04* | (2006.01) |
| *B29C 69/00* | (2006.01) |

(52) U.S. Cl.
CPC .............. *D21J 3/00* (2013.01); *B65D 5/5083* (2013.01); *B65D 65/466* (2013.01); *B65D 75/24* (2013.01); *B65D 85/324* (2013.01); *B29C 43/02* (2013.01); *B29C 69/001* (2013.01); *D04H 1/732* (2013.01); *D21H 5/2671* (2013.01)

(58) Field of Classification Search
CPC ....... D21J 3/00; B65D 5/5083; B65D 65/466; B65D 75/24; B65D 85/324; B65D 2543/00046; B65D 85/30; B65D 5/508; B29C 43/02; B29C 69/001; D04H 1/732; D21H 5/2671; D21H 5/26; D21H 5/265; B27N 5/00
See application file for complete search history.

(56) References Cited

U.S. PATENT DOCUMENTS

| | | | | |
|---|---|---|---|---|
| 4,418,031 | A * | 11/1983 | Doerer | B29C 70/38 428/326 |
| 4,640,810 | A * | 2/1987 | Laursen | D04H 1/732 264/518 |
| 5,964,933 | A * | 10/1999 | Nakamura | C08L 97/02 106/217.7 |
| 6,437,022 | B1 * | 8/2002 | Yoshihara | A45C 13/42 523/128 |
| 9,637,608 | B2 * | 5/2017 | Rosen | C08L 67/03 |
| 11,697,896 | B2 * | 7/2023 | Yamada | B65D 65/466 428/36.1 |
| 12,240,673 | B2 * | 3/2025 | Kuiper | B65D 65/466 |
| 2010/0190020 | A1 * | 7/2010 | Frederiksen | B29C 43/02 162/146 |
| 2019/0070819 | A1 † | 3/2019 | Larsson | |
| 2020/0114625 | A1 * | 4/2020 | Van Trump | B32B 23/048 |
| 2020/0131710 | A1 * | 4/2020 | Kuiper | B65D 85/30 |
| 2021/0009327 | A1 * | 1/2021 | Kuiper | B65D 65/466 |
| 2021/0163198 | A1 * | 6/2021 | Kuiper | B65D 65/466 |
| 2021/0164171 | A1 * | 6/2021 | Kuiper | B65D 65/466 |
| 2021/0261310 | A1 * | 8/2021 | Kuiper | B65D 85/324 |
| 2022/0056623 | A1 * | 2/2022 | Hanley | B27N 1/00 |

(Continued)

FOREIGN PATENT DOCUMENTS

| AU | 2018277511 A1 * | 1/2020 |
|---|---|---|
| CA | 2010080 C * | 12/2000 |

(Continued)

OTHER PUBLICATIONS

Aliotta et al. in "A Brief Review of Poly (Butylene Succinate) (PBS) and Its Main Copolymers: Synthesis, Blends, Composites, Biodegradability, and Applications," Polymers, 14, 844, pp. 1-23 (Year: 2022).*

*Primary Examiner* — Jose A Fortuna
(74) *Attorney, Agent, or Firm* — MH2 Technology Law Group, LLP

(57) ABSTRACT

The present invention relates to a method for manufacturing a 3-dimensional shaped product from a fluff pulp material and such product. The method according to the invention comprises the steps of:
providing a fluff pulp material;
providing an air-laid flow of fluff pulp material to a 3-dimensional shaped mould;
forming the product in the mould; and
releasing the 3-dimensional shaped product from the mould.

13 Claims, 7 Drawing Sheets

(56) References Cited

U.S. PATENT DOCUMENTS

| | | | |
|---|---|---|---|
| 2023/0166895 A1* | 6/2023 | Kuiper | B32B 3/266 |
| | | | 428/35.7 |
| 2023/0287611 A1* | 9/2023 | Yamada | D04H 3/011 |
| 2024/0336419 A1* | 10/2024 | Kuiper | B32B 27/306 |
| 2024/0351777 A1* | 10/2024 | Kühn | B65D 85/8043 |

FOREIGN PATENT DOCUMENTS

| | | | | |
|---|---|---|---|---|
| CN | 110998024 A | * | 4/2020 | |
| CN | 112469862 A | * | 3/2021 | B65D 85/324 |
| CN | 120091955 A | * | 6/2025 | B65D 77/12 |
| EP | 1840043 A1 | * | 10/2007 | B29C 43/02 |
| EP | 1840043 B1 | * | 9/2009 | |
| EP | 3631085 B1 | * | 3/2021 | |
| EP | 3824140 B1 | * | 9/2022 | B65D 65/46 |
| ES | 2929503 T3 | * | 11/2022 | B29C 48/21 |
| KR | 102268776 B1 | * | 6/2021 | |
| NL | 2025240 B1 | * | 9/2021 | |
| RU | 2019143350 A | * | 7/2021 | |
| WO | WO-0242070 A1 | * | 5/2002 | |
| WO | WO-2014142714 A1 | * | 9/2014 | |
| WO | WO-2015036659 A1 | * | 3/2015 | B29C 44/022 |
| WO | WO-2017160218 A1 | * | 9/2017 | |
| WO | WO-2023285655 A1 | * | 1/2023 | B65D 65/466 |

\* cited by examiner
† cited by third party

METHOD FOR THE MANUFACTURING A 3-DIMENSIONAL SHAPED PRODUCT FROM A FLUFF PULP MATERIAL AND SUCH PRODUCT

BACKGROUND

Field of the Technology

The present invention relates to a method for manufacturing a 3-dimensional shaped product from a fluff pulp material. Such product may relate to packaging units for fruits and eggs, sip lids, covers, and inlay trays, for example.

Description of the Prior Art

Products such as packaging units having 3-dimensional shape that are made from a moulded pulp material are known. Such moulded pulp often originates from recycled paper material and/or virgin fibres. These packaging units are shaped to store, transport and/or display a range of product, including food products such as eggs, tomatoes, kiwi's.

One of the problems with such products is the amount of energy that is used for the manufacturing process that typically involves a significant drying step for the moulded product.

BRIEF SUMMARY

The present invention has for its object to obviate or at least reduce the above stated problem in conventional products that are manufactured from a moulded pulp material and to provide a 3-dimensional shaped product that is more sustainable having a lower carbon footprint and reducing the amount of energy that is required in the manufacturing process.

For this purpose, the present invention provides a method for manufacturing a 3-dimensional shaped product from a fluff pulp material, the method comprising the steps of:
  providing a fluff pulp material;
  providing an air-laid flow of fluff pulp material to a 3-dimensional shaped mould;
  forming the product in the mould; and
  releasing the 3-dimensional shaped product from the mould.

The method provides a 3-dimensional shaped product having a length, a width and a height according to certain specifications or requirements. Mostly, these specifications or requirements will be defined in accordance with the products that are carried in or by the product, for example. In case a product that is manufactured according to the method of the present invention relates to packaging units for fruits and eggs, sip lids, covers, and inlay trays, the specifications or requirements are defined by the number and/or size and/or shape of the packed or carried 3-dimensional products. Preferably, the shaped product has a shape that relates to the products it is designed for. It will be understood that other shapes could also be envisaged in accordance to the invention.

The (raw) fluff pulp material preferably comprises long fibre softwoods. This material is often applied in personal care products. It will be understood that the fluff pulp material that is used in the manufacturing process according to the present invention may also comprise other components. The raw fluff pulp material is pre-treated to provide the fluff pulp material for the air-laid flow. Such pre-treatment may involve producing a more or less uniform sheet material that optionally comprises some additives. To provide the fluff pulp material to the mould a binder may be used, for example as a spray or foam. This reduces the amount of water that is used in the manufacturing process for a conventional moulded fiber (packaging) product. In fact, in conventional moulded pulp products water is used as a carrier. Obviating the need for water as a carrier significantly reduces the amount of water that is required in the manufacturing process. This results in a significant reduction of the energy that is required for drying the resulting products. Also, this significantly reduces the carbon footprint of the end-products that are manufactured according to the method of the present invention.

Furthermore, the air-laid process enables a relatively high manufacturing rate due to the reduced requirements for a drying operation as compared to conventionally manufactured moulded pulp products. This further improves the overall efficiency of the manufacturing process.

By providing the fluff pulp material to a mould a 3-dimensional shaped product can be manufactured. Forming the product involves pressing the pulp material in the mould or moulds to shape the product. Forming may include additional heat treatments to activate and cure one or more of the additives that may be provided to the fluff pulp. This provides the end-product with sufficient strength and stability for its purposes. The type and amount of additives is preferably designed in accordance to the specific requirements of the manufactured product. The heat treatments are preferably performed in the mould, providing in-mould heat treatment of the manufactured product(s). Optionally, or in addition thereto, heat treatments are performed after releasing the product from the mould.

After releasing the product from the mould further treatments may be performed, including coating, labelling, and further processing steps. The air-laid processing step according to the manufacturing method of the invention preferably also includes so-called spun-laid processing. As a further advantage the products resulting from the manufacturing process of the invention are preferably bio-degradable. In a most preferred embodiment the resulting product is capable of being subject to ambient or at home decomposing. This further improves the sustainability of the resulting product and the manufacturing process.

Preferably, the (raw) fluff pulp material comprises defibrizing the raw material. This defibrizing is preferably performed in a hammer-mill, preferably after a shredding process. This enables achieving the desired material characteristics for the end-product, for example relating to strength and stability of this product.

In a presently preferred embodiment of the invention the method further comprises the step of compacting the fluff pulp material before providing it to the mould.

By compacting the fluff pulp the quality of the resulting end-product can be significantly improved. For example, this may increase the strength of the end-product and enable it carrying a fruit, egg, electronic device, for example.

In a presently preferred embodiment of the invention wherein the step of providing an air-laid flow of moulded pulp material comprises providing a blanket-shaped flow to the mould.

By providing a blanket-shaped flow to the mould an effective manufacturing process can be achieved. Preferably, a compacting step is performed to provide a blanket having a certain length and width, and also a more or less homogeneous thickness. This improves the homogeneity of the end-product. In a presently preferred embodiment the thickness of the blanket is in the range of 0.5 to 3.0 cm. It was shown that providing the fluff pulp material in a blanket shape to the mould with the blanket having a thickness in the mentioned range provides the end-product with an improved homogeneity. This improves the overall quality of the end-product.

Preferably, in the manufacturing process, the mould is heated to enable performing a further heat treatment. This is specifically relevant when making use of additives to improve the overall performance of the end-product.

Furthermore, forming the product in the mould preferably comprises the step of punching the product out of the blanket-shaped flow and providing it to the mould. In this context, punching may involve cutting, pressing or any other forging step. This enables providing the desired amount of material to the mould, thereby reducing the variation in the end-products, for example.

In a presently preferred embodiment of the invention the method further comprises the step of feeding the remaining material to the providing step of the fluff pulp material. Effectively, this enables a return possibility to re-introduce the remaining material of the blanket-shaped flow into the material flow of the manufacturing process. This significantly reduces the amount of waste material from the manufacturing process. Furthermore, this provides the manufacturing process with fluff material that has already undergone some processing steps. This further improves the efficiency of the manufacturing process and further reduces the overall carbon footprint, for example.

In one of the presently preferred embodiments of the invention the method further comprises the step of mixing the fluff pulp material with pulp material originating from recycled paper material.

Combining the fluff pulp material with a recycled stream of recycled paper enables a cost effective manufacturing process by reducing the amount of virgin fibres in the manufacturing process. This further improves the sustainability of the overall manufacturing process. The amount of recycled fibres in the end-product may be in the range of 0-100 wt %, preferably lies in the range of 10-90 wt %, more preferably lies in the range of 25-75 wt %, and lies most preferably in the range of 30-65 wt %.

In one of the presently preferred embodiments of the invention the method further comprises the step of providing one or more additives to the fluff pulp material.

By providing one or more additives to the fluff pulp material the product characteristics of the end-product can be brought into conformity to the desired product characteristics.

Optionally, additives may relate to a binder to bind the fluff pulp. In addition or alternatively, the additives comprise one or more biodegradable biopolymers. Such polymer may enhance the product characteristics, for example strength, stability, robustness, oil and/or water resistance. The preferably applied biodegradable biopolymer preferably comprises a biodegradable aliphatic polyester, preferably one or more of PBS, PHB, PHA, PCL, PLA, PGA and PHBV. For example, adding an amount of PLA and/or PBS and/or another biopolymer in the range of 0-25 wt %, preferably 0.5-20 wt %, more preferably 0.75-10 wt %, even more preferably in the range of 1-8 wt %, and most preferably in the range of 2-5 wt %, to the pulp material improves the strength of the end-product. Preferably, a heat treatment is performed to activate and cure the additives to achieve the desired effect. More preferably, the heat treatment is performed after the fluff material is brought into the mould and into its desired shape. For example, the fluff material is brought into the mould at a temperature of about 100° C. After the product has taken its desired shape a heat treatment can be performed by bringing the product to a temperature in the range of 145-175° C. to enable the PLA fibres to distribute around the cellulosic fibres of the fluff pulp material. It will be understood that the actual process temperatures may depend on the composition of the pulp material, for example.

The biopolymer is in some of the preferred embodiments of the invention mixed in the original pulp material such that it is distributed over substantially the entire product and/or can be provided as a separate layer on a surface of the product that may come into contact with a food product, for example.

A further advantage of the present invention is the improvement of barrier properties by using an additive. Barrier properties may include oxygen and/or grease barriers. Also, the penetration of oil originating from the food product, such as pasta or French fries, into the end-product can be reduced. Furthermore, in the production of (Chinet) disposable tableware the fluorine chemistry can be reduced or even omitted from the manufacturing process, for example. Also, water barrier properties can be improved to reduce the penetration of water into the packaging unit and thereby reducing ridging problems, for example.

In the context of this invention biodegradable preferably comprises decomposing and/or is performed at a temperature in the range of 5 to 60° C., preferably in the range of 5 to 40° C., more preferably in the range of 10 to 30° C., even more preferably in the range of 15 to 25° C., and most preferably at a temperature of about 20° C.

For example, PBS decomposes naturally into water, $CO_2$ and biomass, thereby providing a biodegradable alternative material to plastics, for example. The use of PBS as a compostable material contributes to providing a sustainable product.

The use of a biopolymer like PBS is possible in food-contact applications including food packaging units from a pulp material. As mentioned PBS has good biodegradable properties and PBS can be decomposed to $H_2O$ and $CO_2$. This improves recycling properties of the product that are made from fluff pulp material and comprise PBS and/or similar additive.

A further advantage of adding an amount of PBS and/or similar additive is that the end-product can also be decomposed using microorganisms in soil, for example. This enables decomposing the product comprising PBS and/or a similar additive as a whole. In such preferred embodiment, the food packaging unit can be decomposed at home. For example, the decomposition rate of PBS is much higher as compared to other agents or components such as PLA (including variations thereof such as PLLA, PDLA and PLDLLA, for example). Preferably, the use of biodegradable aliphatic polyester is combined with the use of further additives or substances that aim at improving or achieving specific properties of the packaging unit. In further presently preferred embodiments the bio-polymers that are applied originate from so-called non-gmo (non-genetically modified organisms) biopolymers.

In a further embodiment of the invention the end-product comprises an amount of micro fibrillated cellulose (MFC) sometimes also referred to as nanofibrillar cellulose or cellulose nanofibers. MFC preferably originates from cellulose raw material of plant origin. The use of MFC enhances the fiber-fiber bond strength and further improves the reinforcement effect. Although MFC is preferably applied in combination with PBS and/or one or more of the biodegradable aliphatic polyesters, it is also possible to use MFC as an alternative to these components.

In an embodiment of the invention the bio-polymers and/or MFC provide a biofilm on or at (a part of) the surface of the product. Experiments indicate that good barrier properties can be achieved. Alternatively, or in addition thereto, a paper look and/or paper feel surface layer can be provided. This contributes to the consumer's appreciation of the product according to such embodiment of the invention. Tests have shown a good wet strength and barrier properties. Barrier properties may include oxygen and/or grease barriers. It is believed that the oxygen barrier properties are achieved by the ability of MFC to form a dense network involving hydrogen bonds.

Optionally, some hydrophobic elements are added to an MFC layer to further improve the water barrier properties. This may involve modification of the hydroxyl groups, for example on the surface of the micro fibrils chemically and/or by absorption of polymers, for example.

A further advantage of the use of MFC is the improved printability, including digital printing possibilities. In addition or as an alternative, MFC may reduce cost by reducing the weight or grammage by increasing the amount of fillers. This may also enhance the optical properties.

It will be understood that combinations of MFC and/or PBS and/or biodegradable aliphatic polyesters may further improve the mentioned effects and advantages. Also, combinations with conventional polymer films, for example by coating MFC, PBS and/or a biodegradable aliphatic polyester thereon, may provide a product with the advantages of both types of material.

In a further preferred embodiment of the invention the method further comprises the step of providing a finishing layer to the moulded product.

Such finishing layer may involve coating and/or printing, optionally including in-mould labelling and/or coating. This further improves the efficiency of the overall manufacturing process.

The invention further relates to 3-dimensional shaped product from a fluff pulp material, wherein the product comprising an amount of fluff pulp material.

Such product provides the same effects and advantages as described in relation to the food packaging unit. Such a 3-dimensional shaped product from a fluff pulp material may relate to packaging units for fruits and eggs, sip lids, covers, and inlay trays, for example. Preferably, the 3-dimensional product is shaped in accordance with its intended use. For example, in case of a food packaging unit, it may comprise a compartment capable of receiving or carrying a food product. For example, a food receiving compartment may relate to a compartment capable of holding a food product, such as eggs, tomatoes, kiwis, or a container for holding a beverage.

As a further effect the product of the invention may comprise one or more additives or agents, such as a biopolymer. This enables a specific design of the product characteristics and properties according to customer's specifications or needs taking into account the specific product. Preferably, the one or more further agents comprise a biodegradable aliphatic polyester.

BRIEF DESCRIPTION OF THE DRAWINGS

Further advantages, features and details of the invention are elucidated on the basis of preferred embodiments thereof, wherein reference is made to the accompanying drawings, in which.

DETAILED DESCRIPTION OF THE PREFERRED EMBODIMENTS

Figure 1:
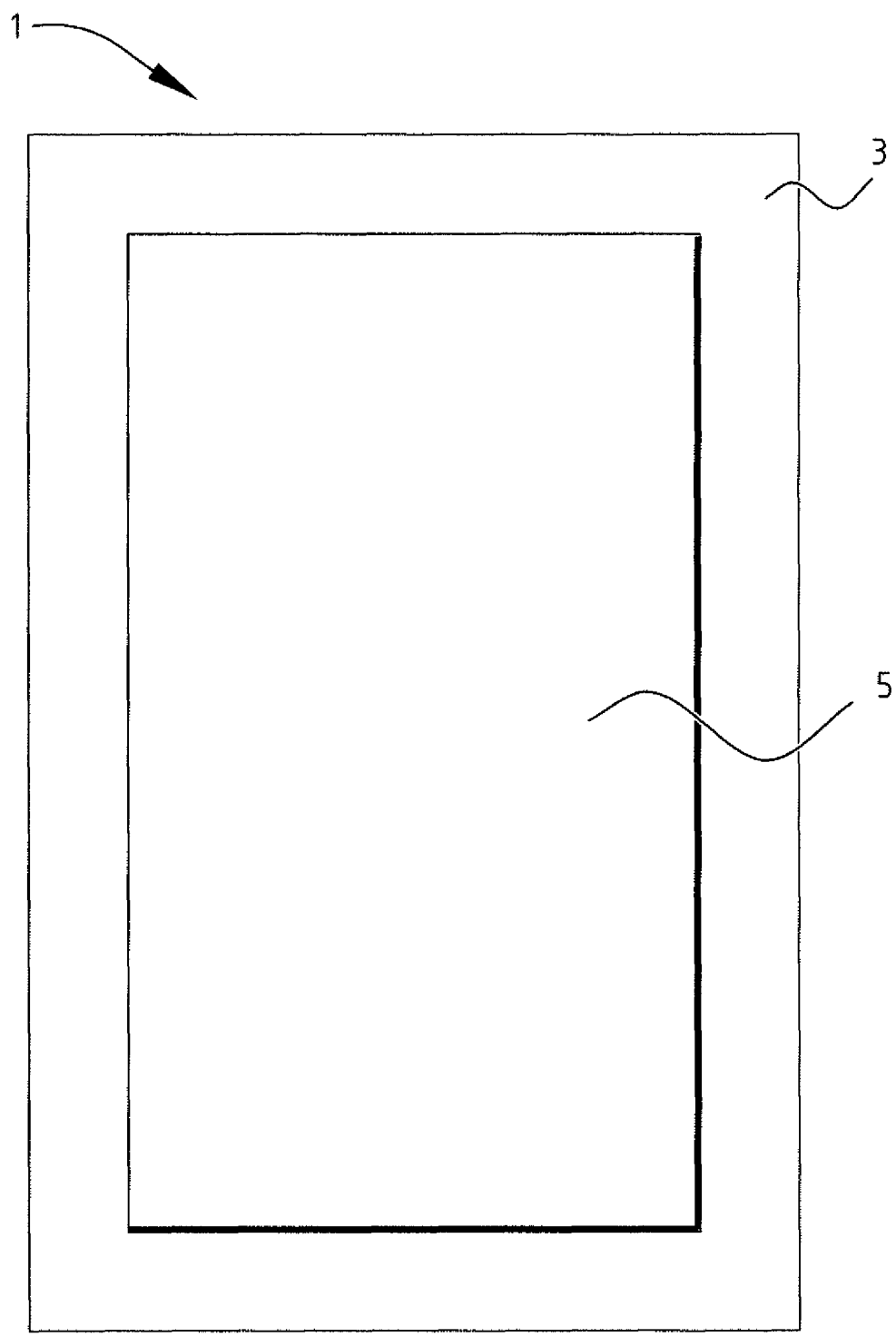
FIG. 1 shows a inlay tray according to the invention.

Product 1 (FIG. 1) relates to an inlay tray for a mobile phone. Product 1 comprises outer edge 3 and recess 5 that is adapted to the size of the specific type of mobile phone. Product 1 is manufactured from a fluff pulp material and preferably comprises a biopolymer.

Figure 2A:
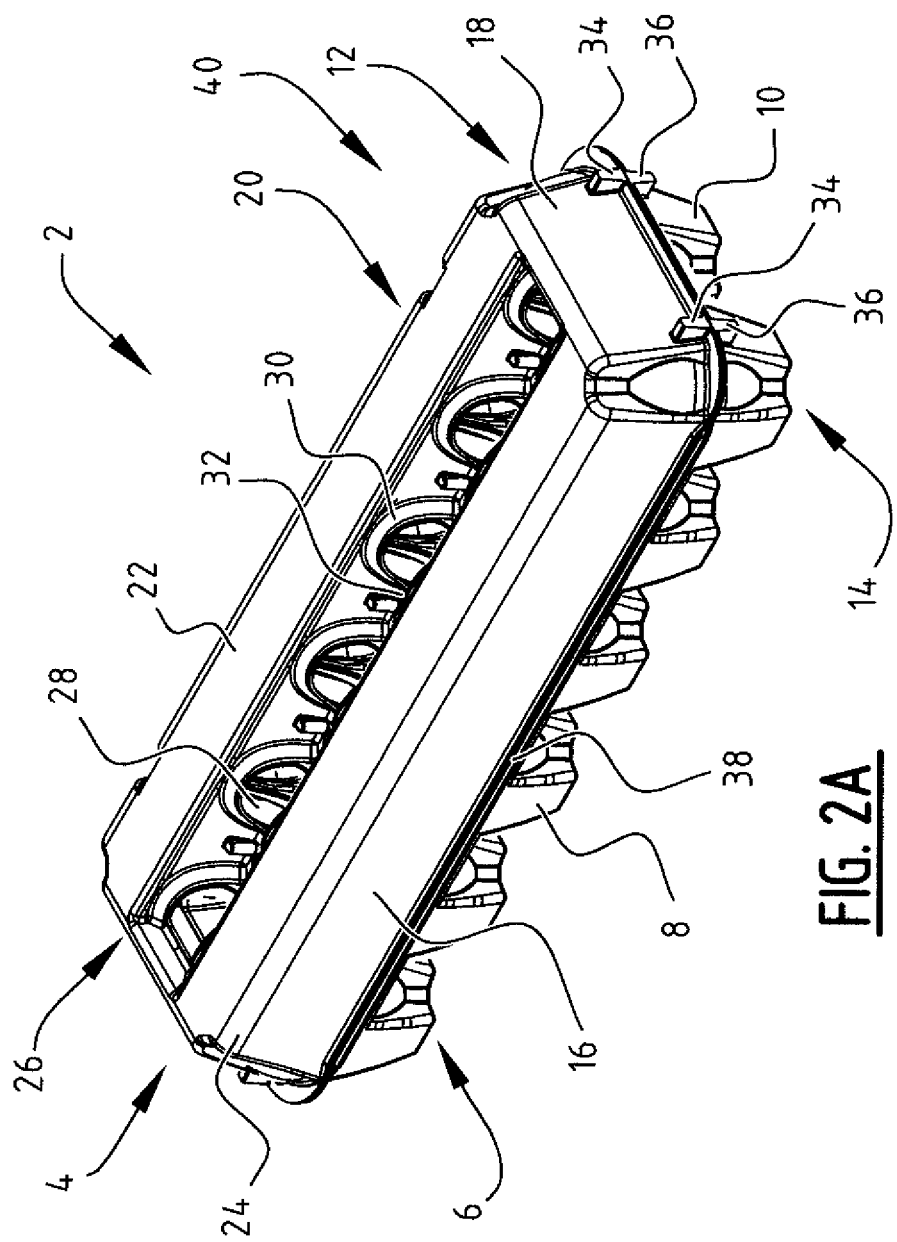
FIGS. 2A and 2B shows a packaging unit according to the invention.
Figure 2B:
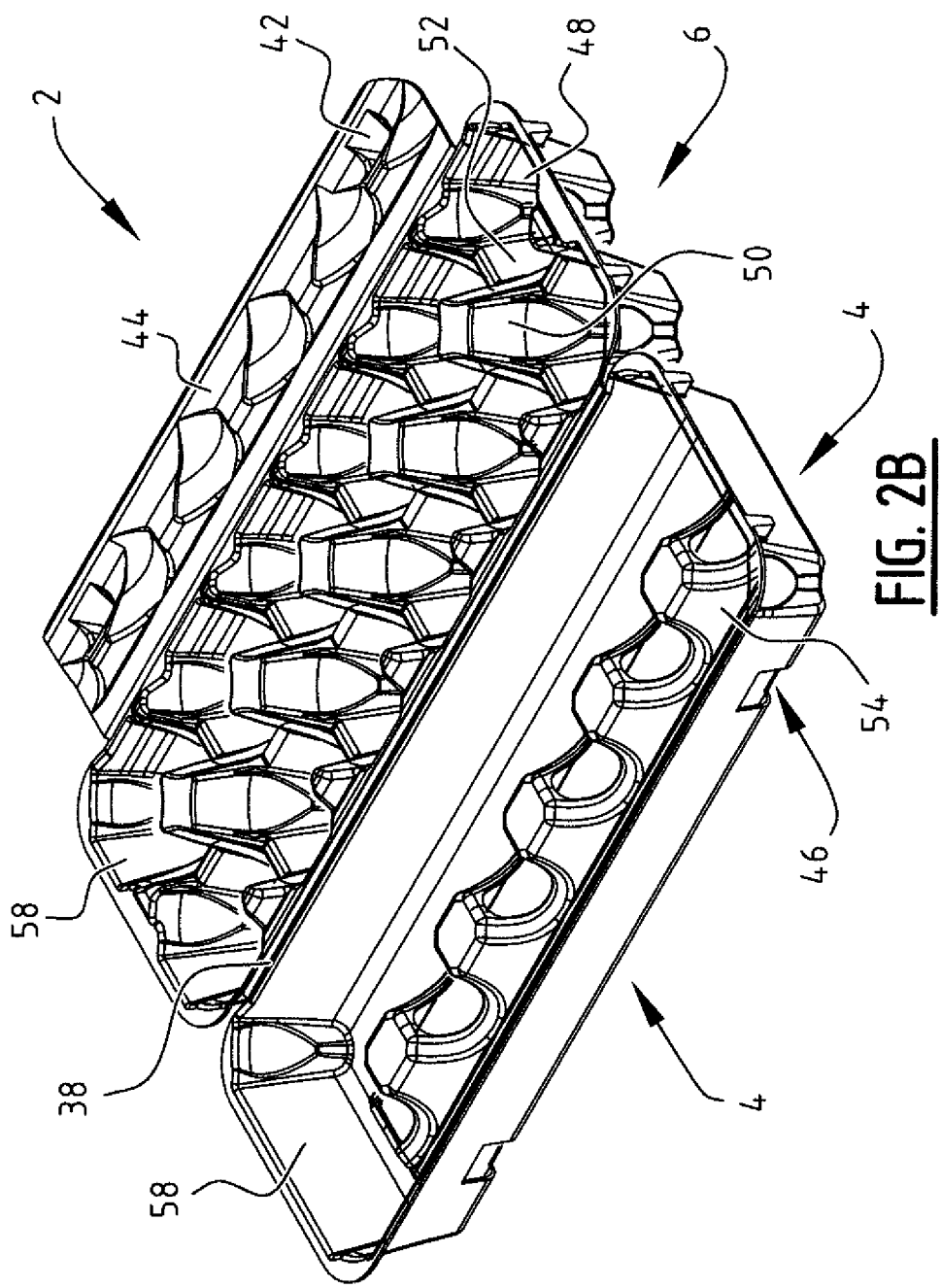

Product 2 relates to a packaging unit (FIGS. 2A and 2B) that in use carries or holds eggs and comprises cover part 4 and bottom part 6. Bottom part 6 is provided with back surface 8, sides 10 and front surface 12, and bottom surface 14. Cover part 4 is provided with back surface 16, side surfaces 18, front surface 20 and top surface 22. In the illustrated embodiment transition 24 is provided between top surface 22 and back and front surfaces 16, 20.

In the illustrated embodiment, top surface 22 of cover part 4 is provided with groove 26 comprising a number of openings 28. Openings 28 are defined by two adjacent arch-shaped edges 30, 32 having a larger thickness as compared to the average thickness of cover part 4. Side surfaces 18 of cover part 4 are provided with denest nocks or denest elements 34. In the illustrated embodiment, bottom part 6 is provided with similar elements 36 mirroring denest elements 34. Hinge 38 connects back surface 16 of cover part 4 with back surface 8 of bottom part 6. Lock 40 comprises nose-shaped lock element 42 that is connected to flap 44 of bottom part 6. Cover part 4 is provided with openings 46 that capture lock elements 42 therewith defining lock 40.

In the illustrated embodiment, bottom part 6 is provided with a number of product receiving compartments 48, cones 50 and separating walls 52. Cone 50 extends from the bottom of bottom part 6 in an upward direction. Cover part 4 comprises cone support 54. Inner surface 58 of packaging unit 2 comprises PBS material, optionally as film layer or alternatively blended and/or integrated with the fibres of the moulded pulp material.

In the illustrated embodiment, packaging unit 2 comprises twelve product receiving compartments 48 that are provided in two rows of six compartments 48. Individual compartments 48 are separated from each other by walls 52 and cones 50. It will be understood that other configurations can also be envisage in accordance to the invention.

Packaging unit 2 may also be configured to receive other products, such as tomatoes, kiwis.

Figure 3:
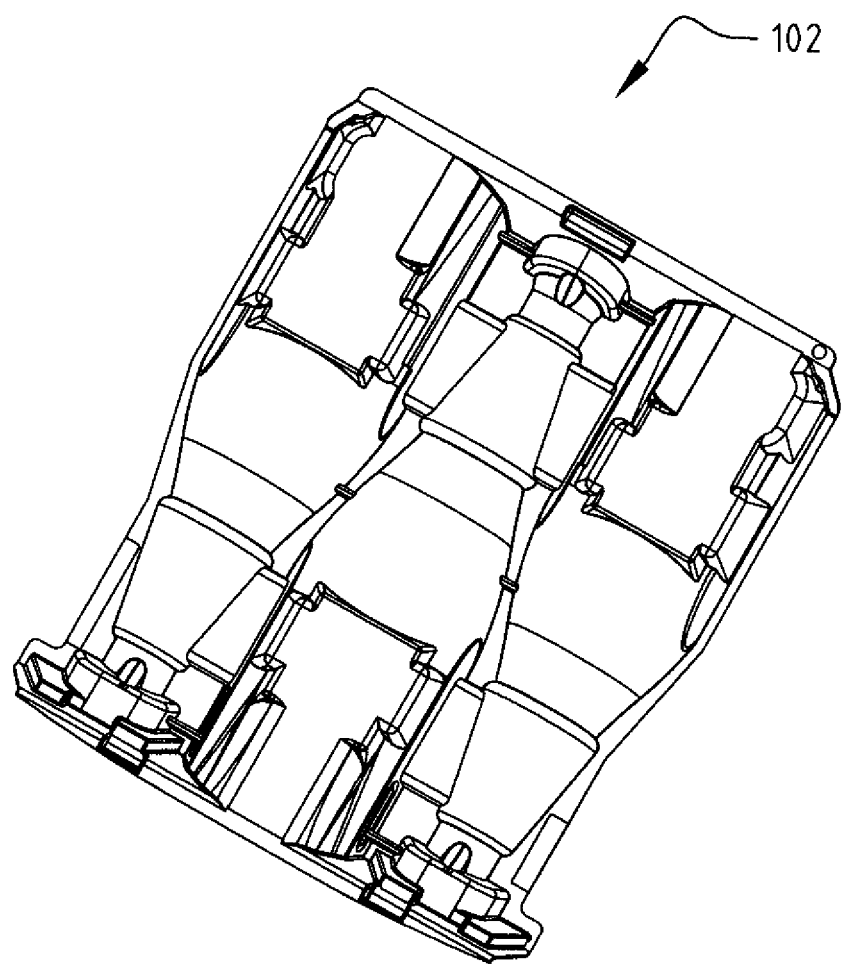
FIG. 3 shows an example of an alternative food packaging product according to the present invention.

It will be understood that other types of food packaging units can also be envisaged in accordance with the present invention. As a further example, bottle divider 101 (FIG. 3) is illustrated. Also, bottle divider 102 may comprise a film layer of PBS and/or may comprise an amount of PBS that is blended into the moulded pulp.

Figure 4A:
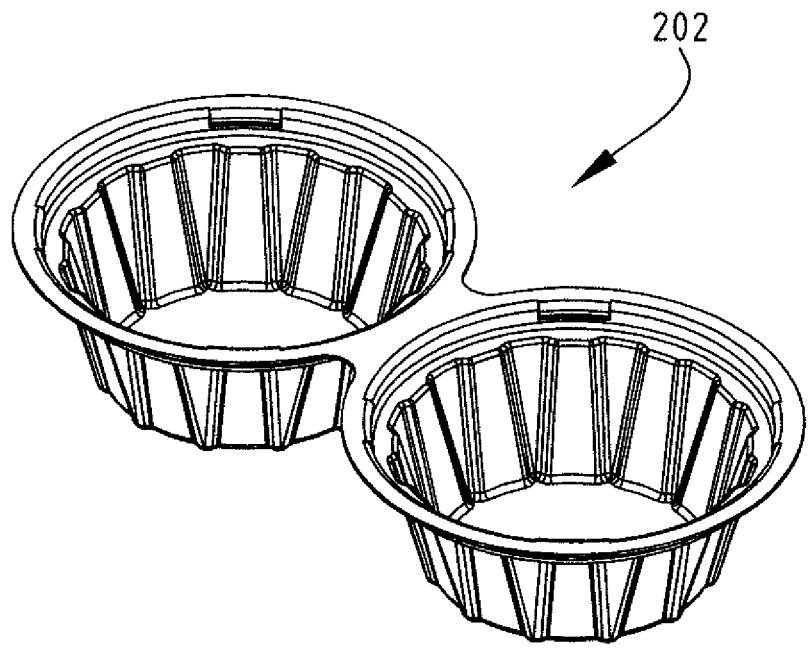
FIGS. 4A and 4B shows an example of a further alternative food packaging product according to the present invention.

A further example in accordance with the present invention is cover 202 (FIG. 4A), for example for an ice cup.

Figure 4B:
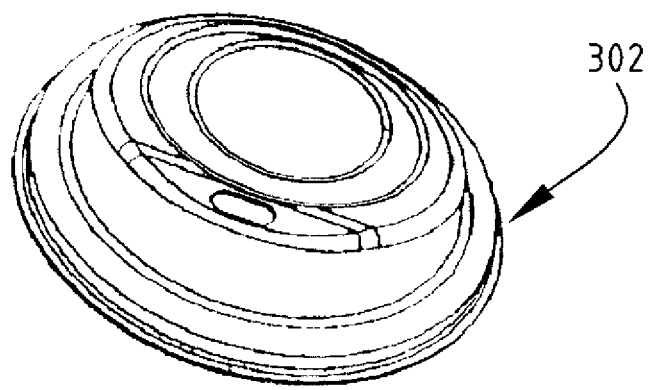

Another example of a packaging unit according to the invention is sip lid 302 (FIG. 4B). Cover 202 and sip lid 302 comprise a film layer of PBS and/or may comprise an amount of PBS that is blended into the moulded pulp. This renders cover 202 and sip lid 302 water or liquid repellent. One of the further advantages of the use of PBS is the reduction or prevention of the liquid entering or migrating into the sip lid material during use. Another advantage is the constancy of size or dimensional stability. In this specific case this prevents sip lid 302 loosening from a cup or beaker for hot beverages such as coffee, tea or soup, or cold beverages such as carbonated drinks, and cup 202 from loosening from an ice cup, for example. It will be understood that such lids 302 can also be applied to other food containers. For example, lids 302 can be applied to containers for milkshakes, for example. Further details and examples of lids 302 are disclosed in WO 2010/064899, including embodiments with specific flanges and notches.

Sip lid 302 is preferably coated with a PBS liner. As mentioned, sip lids 302 can be used for cups and milkshakes. Also, sip lids can be applied to so-called ready meal trays (for example for pizza, wraps, fish, meat, lobster, pasta, . . . ) and act as a (digital) printable and barrier seal, for example.

Figure 5A:
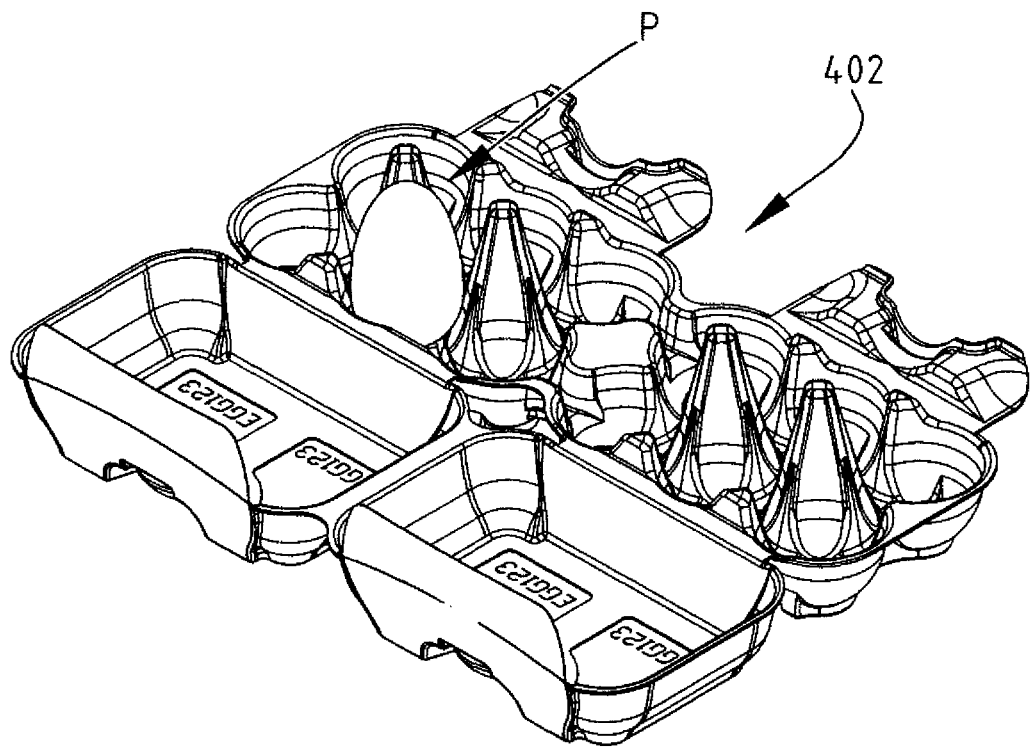
FIGS. 5A and 5B shows further packaging units for eggs according to the present invention.
Figure 5B:
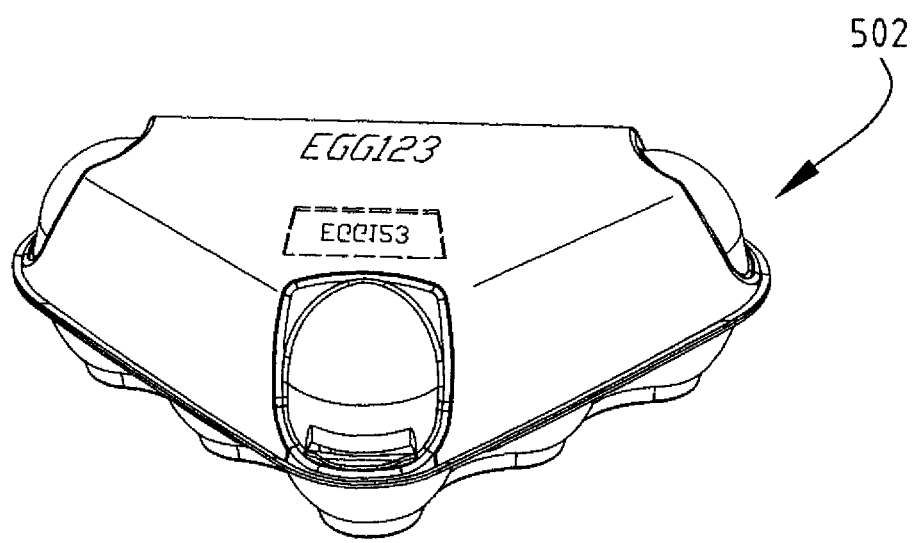

It will be understood that other designs for packaging units in accordance with the invention can be envisaged. For example, containers 402, 502 (FIGS. 5A and 5B) illustrate different designs for egg cartons capable of holding eggs P.

Other examples of food packaging products may relate to cup carriers, cups, plates and other table ware etc.

Figure 6:
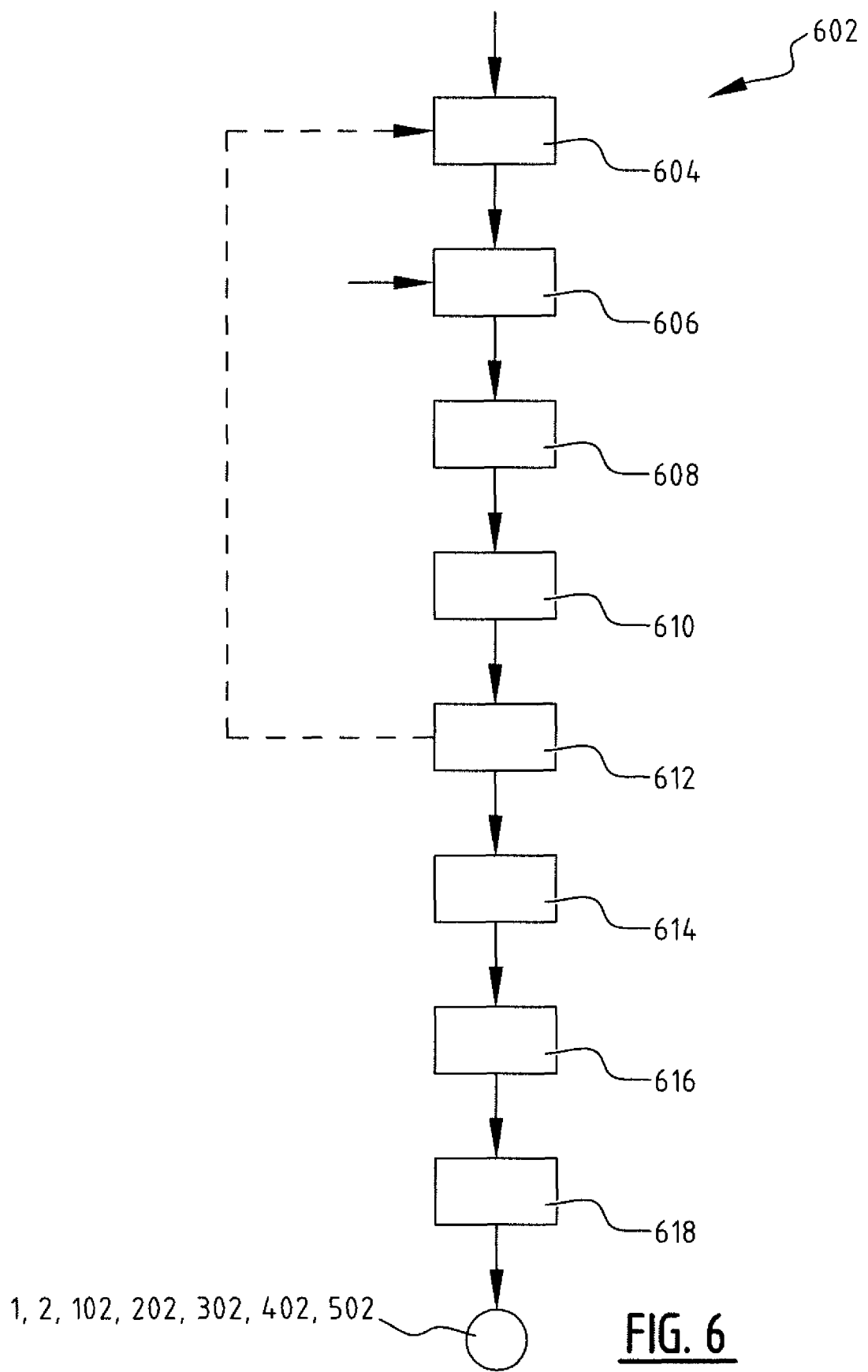
FIG. 6 shows a summary of a schematic overview of the manufacturing method of the invention.

When manufacturing 602 a 3-dimensional shaped product 1, 2, 102, 202, 302, 402, 502 (FIG. 6) a fluff pulp material is prepared in preparation step 604. Optionally, an amount of PBS and/or PLA and/or another biopolymer is blended or mixed into the pulp material in mixing step 606. Further treatments involve defibrization and/or shredding 608, compacting 610, providing the pulp to the mould 612, optionally involving punching, moulding 614, optionally heat treatment 616, and releasing the product 618 to provide 3-dimensional shaped product 1, 2, 102, 202, 302, 402, 502. In the illustrated embodiment a recycle step is shown. In one of the presently preferred embodiments of the invention, the pulp that is provided to the mould in step 612 has a dry matter content above 10 wt %. The length of the cellulose fibers is preferably chosen in relation to the intended use of the 3-dimensional product. Process conditions in the manufacturing are preferably chosen in relation to pulp composition, preferably taken the type and amount of additives into account.

It will be understood that this schematic overview of a manufacturing method of the invention is exemplary and different steps can be included, such as adding further agents and/or additives, providing a biopolymer as a separate layer. Such separate layer may come into contact with a food product. Optionally, also several post-moulding operations may optionally be performed in relation to unit 1, 2, 102, 202, 302, 402, 502 optionally including, but not limited to, labelling including in-mould labelling, marking including printing and digital printing, testing. In several of the preferred embodiments, the compostable biofilm is at least arranged on the food contact area of the product containing part of the packaging unit. In preferred embodiments this film is capable of being used in a microwave or oven as a so-called ovenable film. Preferably, the biofilm is capable of withstanding temperatures up to 170° C., 190° C., or even higher. This biofilm preferably comprises an amount of PBS and/or MFC and/or biodegradable aliphatic polyester that may comprise an amount of one or more of PHB, PHA, PCL, PLA, PGA and PHBV. Especially a combination of a compostable packaging unit involving in-mould drying further improves the sustainability as compared to conventional packaging units. The (digital) printable properties enable printing of packaging and/or food characteristics/information. This may obviate the use of separate sleeves, for example. In addition, it enables the application of prints, for example a fish & chips (newspaper) print on the packaging unit.

The present invention is by no means limited to the above described preferred embodiments thereof. The rights sought are defined by the following claims, within the scope of which many modifications can be envisaged.

The invention claimed is:

1. A method for manufacturing a three-dimensional shaped product from a fluff pulp material, the method comprising:
   providing a fluff pulp material;
   providing one or more additives to the fluff pulp material;
      providing an air-laid flow of fluff pulp material;
      compacting the air-laid flow of fluff pulp material;
      providing the compacted flow of fluff pulp material directly to a three-dimensional shaped mould;
      shaping the fluff pulp material in the mould; and
      releasing the three-dimensional shaped product from the mould,
      wherein compacting the air-laid flow of fluff pulp material increases the strength of the three-dimensional shaped product released from the mould,
      wherein the one or more additives comprises a biodegradable aliphatic polyester in the range of 0.5-20 wt %, and
      wherein biodegradable aliphatic polyester is polybutylene succinate (PBS).

2. The method according to claim 1, wherein providing the fluff pulp material comprises defibrizing raw material.

3. The method according to claim 1, wherein the step of providing an air-laid flow of fluff pulp material comprises providing a blanket-shaped flow.

4. The method according to claim 3, wherein shaping the fluff pulp material in the mould comprises the step of punching the product out of the blanket-shaped flow and providing it to the mould.

5. The method according to claim 4, further comprising the step of feeding a remaining portion of the fluff pulp material to the providing step of the fluff pulp material.

6. The method according to claim 3, further comprising the step of feeding a remaining portion of the fluff pulp material to the providing step of the fluff pulp material.

7. The method according to claim 1, further comprising the step of mixing the fluff pulp material with pulp material originating from recycled paper material.

8. The method according to claim 1, wherein the one or more additives comprises a biodegradable biopolymer.

9. The method claim 1, further comprising the step of providing a finishing layer to the moulded product.

10. A method for manufacturing a three dimensional shaped product from a fluff pulp material, the method comprising:
   providing a fluff pulp material;
   providing one or more additives to the fluff pulp material;
   providing an air-laid flow of fluff pulp material;
   compacting the air-laid flow of fluff pulp material;
   providing the compacted flow of fluff pulp material to a three-dimensional shaped mould;

shaping the fluff pulp material in the mould; and
releasing the three-dimensional shaped product from the mould,
wherein providing the fluff pulp material comprises defibrizing raw material, further comprising the step of compacting the fluff pulp material before providing it to the mould,
wherein the one or more additives comprises a biodegradable aliphatic polyester in the range of 0.5-20 wt %,
wherein biodegradable aliphatic polyester is polybutylene succinate (PBS),
wherein the step of providing an air-laid flow of fluff pulp material comprises providing a blanket-shaped flow to the mould, and
wherein compacting the air-laid flow of fluff pulp material increases the strength of the three-dimensional shaped product released from the mould.

11. The method according to claim 10, wherein shaping the fluff pulp material in the mould comprises the step of punching the product out of the blanket-shaped flow and providing it to the mould.

12. The method according to claim 11, further comprising the step of feeding a remaining portion of the fluff pulp material to the providing step of the fluff pulp material.

13. The method according to claim 12, further comprising the step of providing one or more additives to the fluff pulp material, wherein the one or more additives comprises a biodegradable biopolymer.

* * * * *

UNITED STATES PATENT AND TRADEMARK OFFICE
CERTIFICATE OF CORRECTION

PATENT NO. : 12,509,827 B2
APPLICATION NO. : 16/618727
DATED : December 30, 2025
INVENTOR(S) : Harald John Kuiper et al.

Page 1 of 1

It is certified that error appears in the above-identified patent and that said Letters Patent is hereby corrected as shown below:

In the Claims

In Column 8, Line 46: "The method according to claim 4" should be -- The method according to claim 3 --, In Column 8, Line 49: "The method according to claim 3" should be -- The method according to claim 4 --.

Signed and Sealed this
Third Day of February, 2026

John A. Squires
*Director of the United States Patent and Trademark Office*